May 14, 1957  J. J. PIRZ  2,791,959
COMBINED CHARCOAL BROILER AND PORTABLE ROTISSERIE
Filed May 28, 1954  5 Sheets-Sheet 1
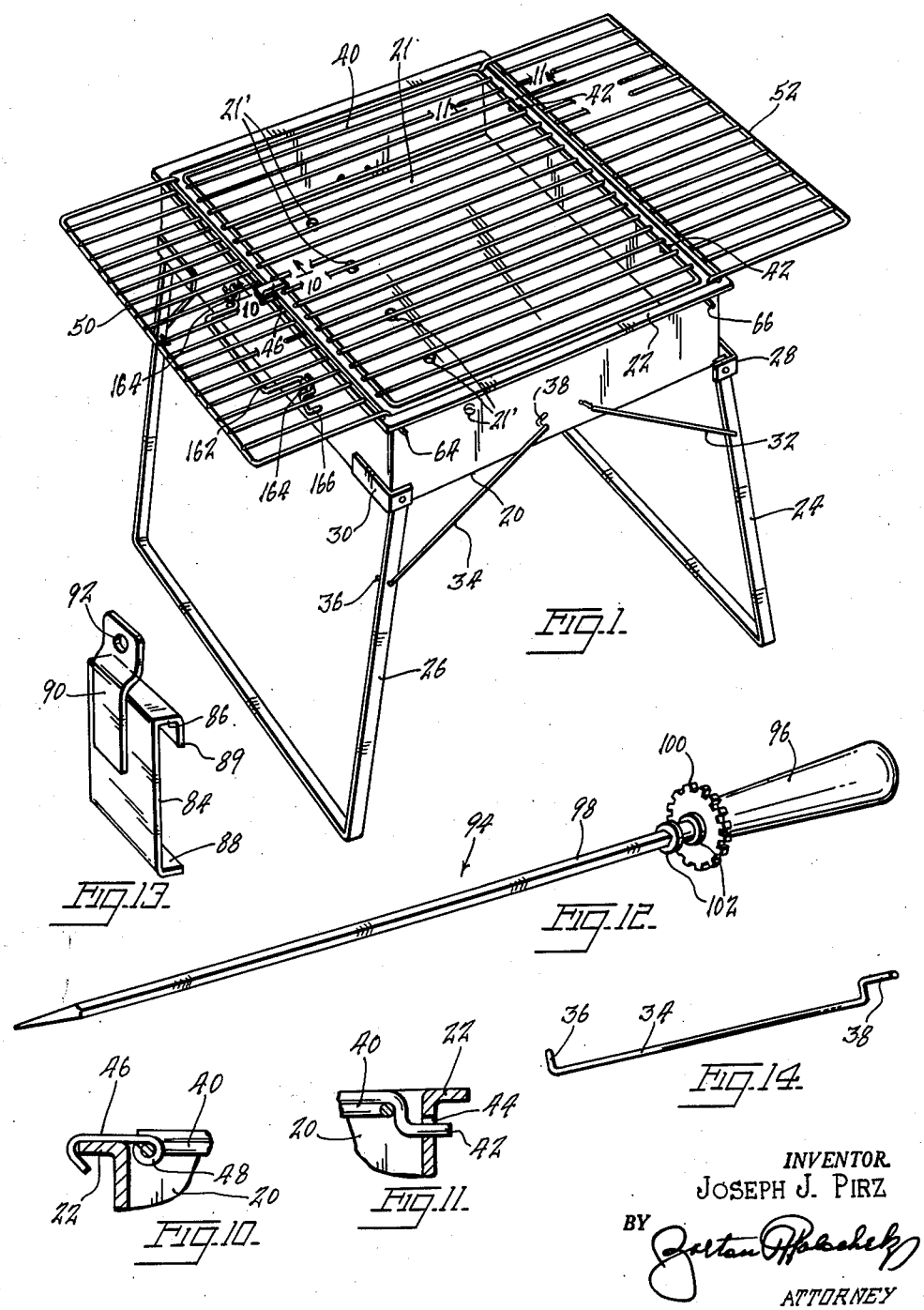
INVENTOR.
JOSEPH J. PIRZ
BY
ATTORNEY May 14, 1957　　　　　J. J. PIRZ　　　　　2,791,959
COMBINED CHARCOAL BROILER AND PORTABLE ROTISSERIE
Filed May 28, 1954　　　　　　　　　　　5 Sheets-Sheet 2
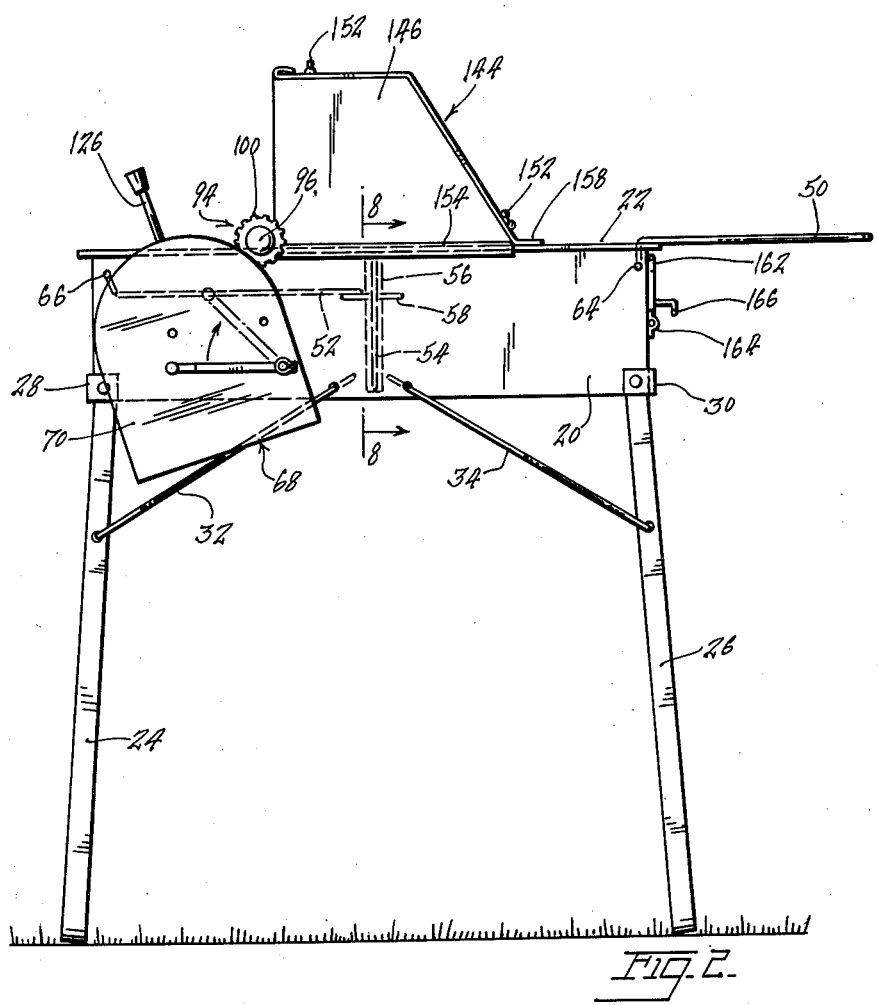
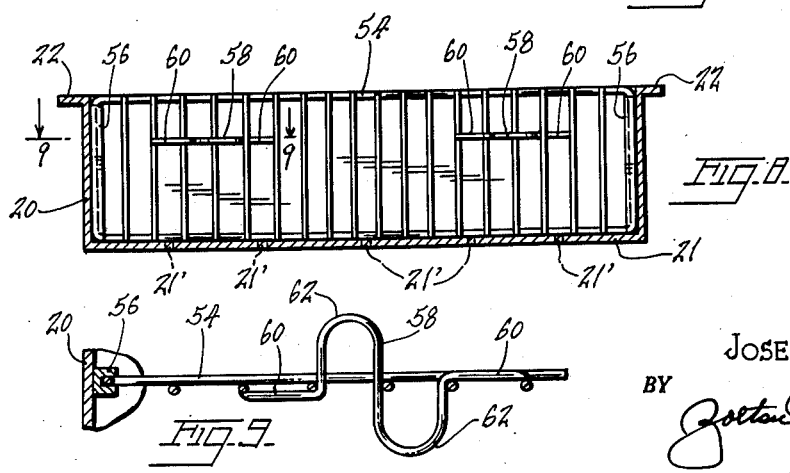
INVENTOR.
JOSEPH J. PIRZ
BY
ATTORNEY May 14, 1957 J. J. PIRZ 2,791,959
COMBINED CHARCOAL BROILER AND PORTABLE ROTISSERIE
Filed May 28, 1954 5 Sheets-Sheet 3
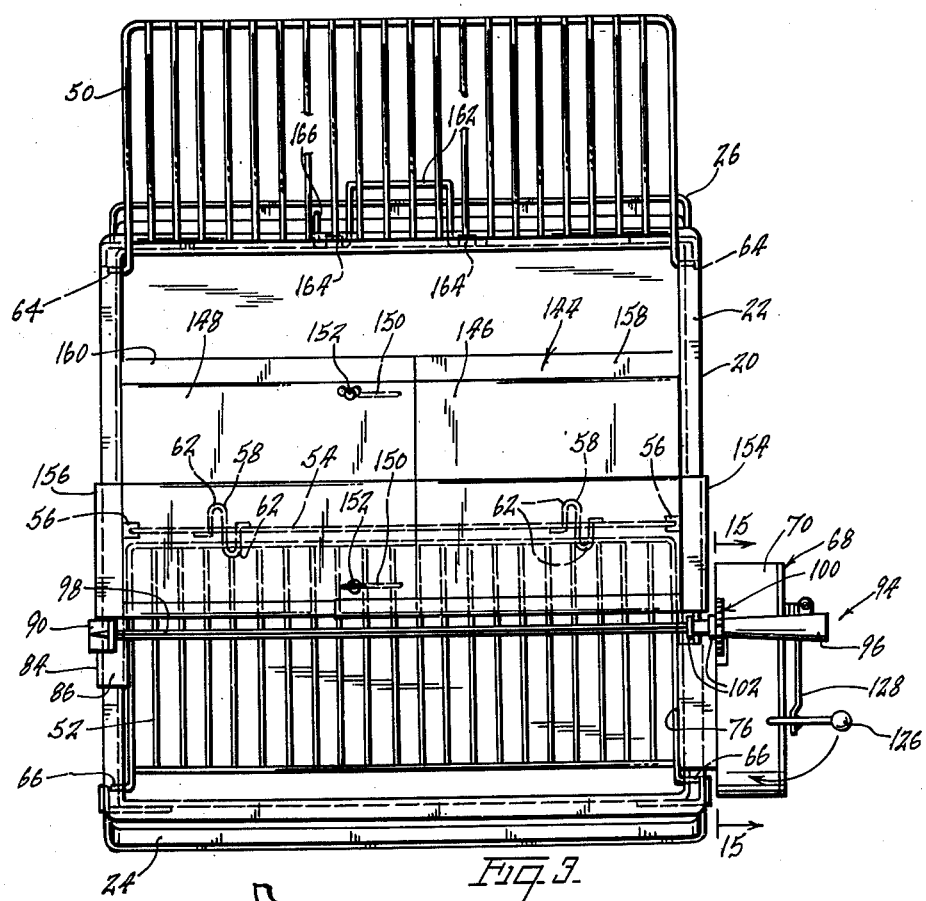
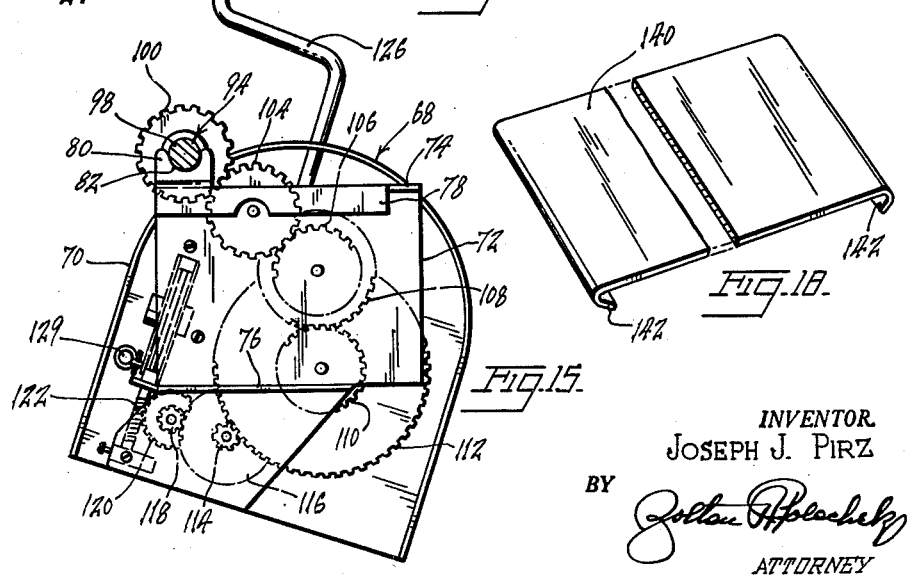
INVENTOR.
JOSEPH J. PIRZ
BY
ATTORNEY

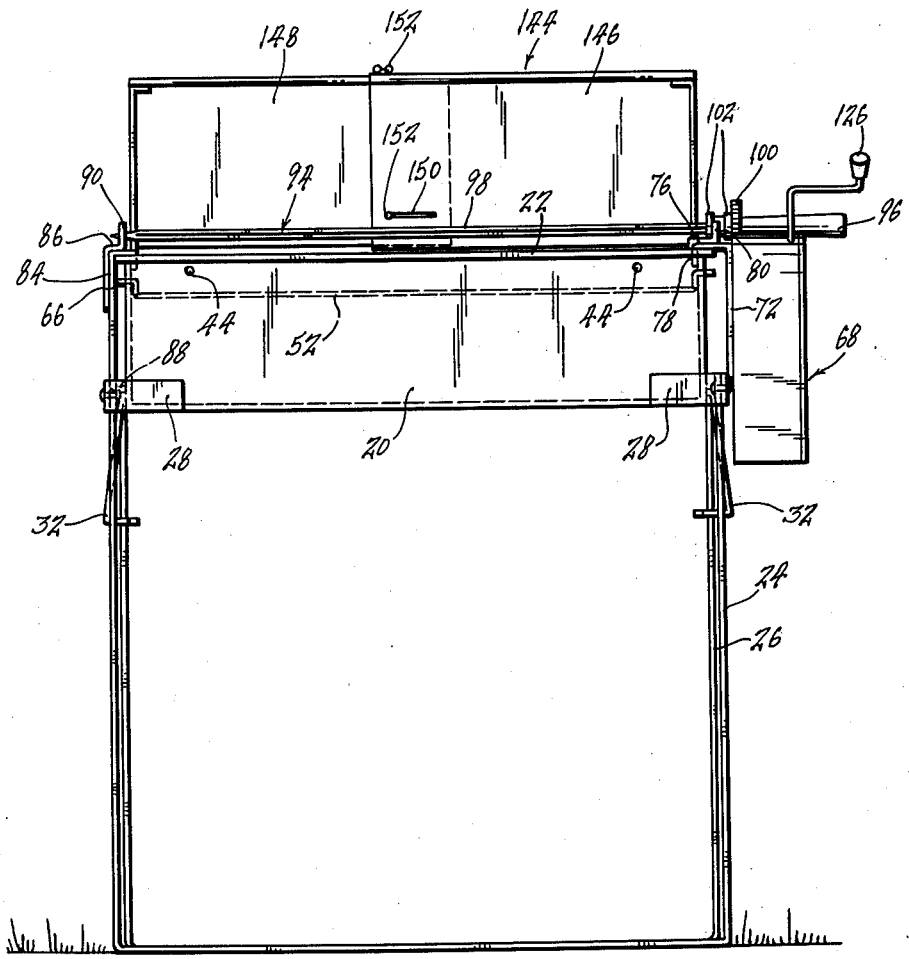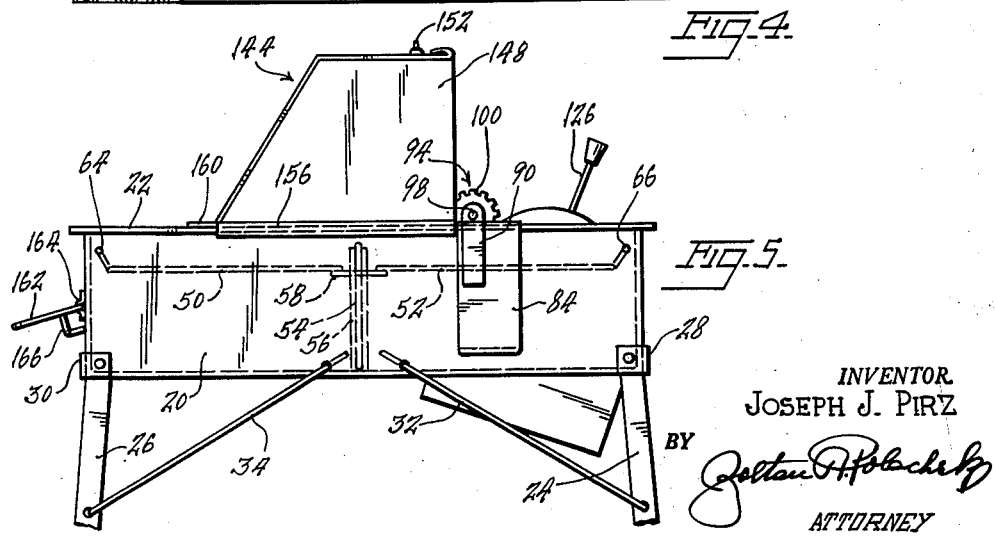

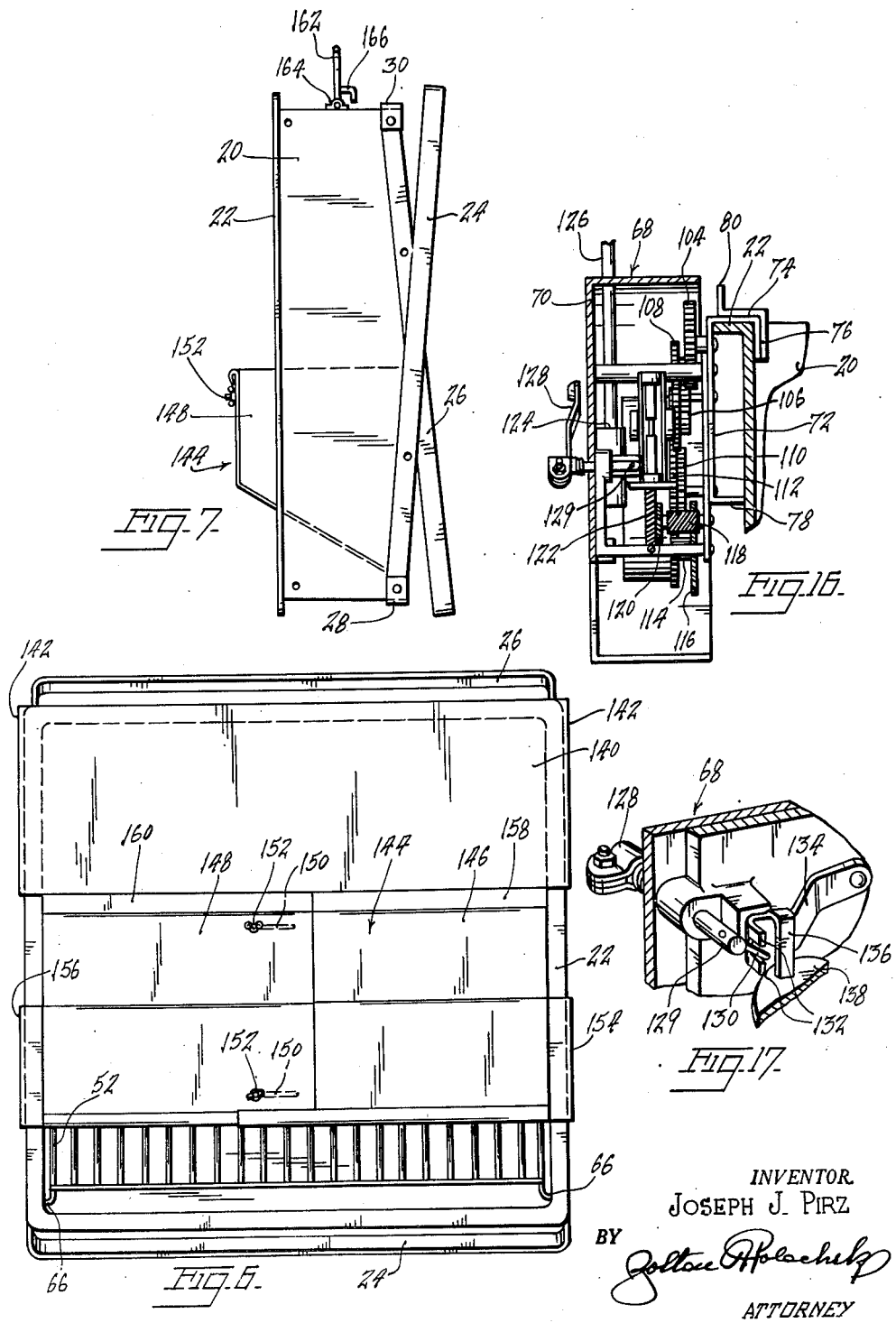

United States Patent Office 2,791,959
Patented May 14, 1957

2,791,959

COMBINED CHARCOAL BROILER AND PORTABLE ROTISSERIE

Joseph J. Pirz, Long Island City, N. Y.

Application May 28, 1954, Serial No. 432,960

1 Claim. (Cl. 99—421)

This invention relates to a combined charcoal broiler and portable rotisserie, particularly adapted to be set up out of doors at any desired location, for use in broiling steaks, chops, etc., or for roasting hams, chickens, and other foods while turning the same on a spit.

Among important objects of the invention are the following:

To embody in a single, light, readily portable and fully collapsible structure, of inexpensive construction, the functional characteristics of both a conventional charcoal broiler, and a rotisserie having a rotatable spit;

To permit the swift and easy conversion of the structure to either of the above referred to uses;

To associate with the rotatable spit a rotating mechanism therefor including a spring motor adapted to be mounted at any location desired between the ends of the structure, with the spit being similarly locatable wherever desired between said ends;

To facilitate the detachable connection of a hood to the structure, so locatable thereupon as to direct heat against the side of the food that is being slowly rotated adjacent thereto;

To facilitate the adjustment of hinged racks inwardly and outwardly of the structure, so as to permit said racks to be used either as means for supporting the food over the fire, or, alternatively, to support beyond opposite ends of the structure food that has already been cooked or is yet to be cooked; and To permit the entire device to be formed of sheet metal or the like, so designed as to its component parts as to permit it to be collapsed into a highly compact article that can be stored away in a small space.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a combined broiler and rotisserie formed in accordance with the invention, in use as a broiler.

Fig. 2 is a side elevational view of the structure in use as a rotisserie.

Fig. 3 is a top plan view of the device in use as a rotisserie.

Fig. 4 is an end elevational view, as seen from the left of Fig. 2.

Fig. 5 is a fragmentary side elevational view, showing the side opposite that illustrated in Fig. 2.

Fig. 6 is a top plan view in which a cover plate has been added.

Fig. 7 is a side elevational view of the device folded for storage.

Fig. 8 is a transverse sectional view on line 8—8 of Fig. 2.

Fig. 9 is an enlarged, detail sectional view substantially on line 9—9 of Fig. 8.

Fig. 10 is an enlarged, detail sectional view on line 10—10 of Fig. 1.

Fig. 11 is an enlarged, detail sectional view on line 11—11 of Fig. 1.

Fig. 12 is an enlarged perspective view of the spit, per se.

Fig. 13 is a perspective view of one of the spit bearing brackets, per se.

Fig. 14 is a perspective view of one of the leg braces.

Fig. 15 is an enlarged sectional view on line 15—15 of Fig. 3, showing the spit-rotating mechanism.

Fig. 16 is a longitudinal sectional view through said mechanism.

Fig. 17 is an enlarged, fragmentary perspective view of said mechanism.

Fig. 18 is a perspective view, part being broken away, of a removable cover plate.

The structure constituting the present invention includes a rectangular receptacle 20 having a flat bottom 21 formed with air vent holes 21' and vertical, upwardly extending, relatively low, side and end walls terminating at their upper edges in a continuous, outwardly directed peripheral flange 22. The receptacle is formed fully open at its top, and can be fashioned from sheet metal or the like, said receptacle being adapted to hold a supply of charcoal or other fuel, for the purpose of building a hot fire in the receptacle, to produce a suitable bed of coals over which articles of food can be broiled, roasted, or otherwise cooked.

The receptacle is suported in elevated position above the ground surface, by U-shaped leg assemblies 24, 26 hingedly connected to opposite ends of the receptacle by means of angular brackets 28, 30, respectively, fixedly secured to the several lower corners of the receptacle, the brackets 28 being attached to the corners at one end of the receptacle and the brackets 30 being similarly attached at the other end thereof. The leg assemblies, 24, 26, when swung downwardly away from the receptacle to the position shown in Fig. 1, diverge downwardly from the receptacle, and are fixedly held in their downwardly swung positions by inclined brace elements 32, 34, formed from suitable lengths of rod material, the brace elements being connected between the midlength portion of the receptacle and intermediate portions of the respective leg assemblies. In Fig. 14 one of the brace elements is shown per se, and is typical of all of said elements, the brace element being illustrated as formed from a straight length of rod material, one end of which is formed with an inwardly directed, lateral extension 36, and the other end of which is formed with an inwardly offset longitudinal extension 38. Extension 36 is adapted to engage in a suitable opening formed in the associated leg assembly, while extension 38 is adapted to be similarly engaged in an opening formed in the adjacent side wall of the receptacle, intermediate the ends of the receptacle. It will be understood that the bases will be provided in pairs, there being one pair at each side of the receptacle.

When the device is to be folded for storage, the brace elements are disengaged from their associated openings, and the leg assemblies are swung upwardly, toward one another, to the positions shown in Fig. 7. In these positions, the leg assemblies are folded substantially flat against the bottom of the receptacle, it being observed that the assembly 24 is slightly wider than the assembly 26, to permit assembly 26 to swing therethrough when the leg assemblies are being collapsed.

When the device is to be used as a broiler only, a main rack or grill 40, formed (Fig. 1) as a rectangular, open frame bridged at intervals spaced closely apart along its length by straight, transverse rods, is removably seated in the open top of the receptacle. The transverse rods of the rack are welded at their ends to opposite sides of the frame, and two of said rods are formed, at one side of the frame, with downwardly offset, outwardly directed end portions 42 (Fig. 11) loosely engageable in openings 44 formed in the adjacent end wall of the receptacle 20. At its opposite side, the rack is provided with a support bracket 46 adapted to hook over the flange 22 and having at its inner end a sleeve in which is hingedly engaged the adjacent side portion of the rack frame.

By reason of this arrangement, the rack 40 can be readily inserted or removed, and when positioned as in Fig. 1, will overlie the hot bed of coals, to permit any of various meats or other foods to be broiled thereupon.

Extension racks 50, 52 are identically but oppositely formed and when positioned as in Fig. 1, provide supports extending beyond opposite ends of the receptacle, on which supports food can be placed before or after movement of said foods onto or off of the main rack.

Extension racks are each formed as an open, rectangular frame having an area approximately half that of the receptacle, and having uniformly spaced, transversely extending rods welded at their opposite ends to opposite sides of the extension rack frame.

With the main rack 40 removed, the extension frames are swingable inwardly of the receptacle, to be supported at their free edges upon a divider 54 (Figs. 8 and 9). Divider 54 is formed as an open, rectangular frame, having transversely extending, uniformly spaced rods welded in place thereupon. The divider can be removably inserted in a vertical position within the receptacle, medially between opposite ends of the receptacle. To this end, the receptacle has at opposite sides thereof inwardly facing, vertically extending, channeled guides 56, into and out of which the opposite ends of the divider 54 are slidable.

Adjacent each end thereof, divider 54 has a ledge projecting laterally of the divider in opposite directions, on which the inwardly swingable extension racks 50, 52 are supportable. Each ledge is formed from a length of stiff wire material (Fig. 9) having straight ends 60 welded to adjacent transverse rods of frame, the end portions 60 merging into an S-shaped intermediate portion, so that each ledge 58 is formed with oppositely extending, approximately U-shaped ledge elements 62 disposed in a common horizontal plane in elevated position above the receptacle bottom.

Extension racks 50, 52 are integrally formed, at their respective ends, with downwardly offset, oppositely and outwardly extending trunnions 64, 66, respectively, engaging in suitable openings formed in the opposite side walls of the receptacle, to swingably mount the respective extension racks for pivotal movement about horizontal axes located adjacent opposite ends of the receptacle. When the extension racks are both swung outwardly, they appear as in Fig. 1, and their function in this position has previously been described herein. The racks can both be swung inwardly, however, in the manner shown in Fig. 5, so as to be supported upon the ledges 58. Or, one rack can be swung inwardly and one left in its outwardly swung position as in Fig. 3.

When the device is to be used as a portable rotisserie, a spit and spit rotating mechanism are removably mounted thereupon. Reference should now be had to Figs. 2-5 and 15-17, wherein the device converted for this use is illustrated to advantage. As will be noted, the spit rotating mechanism has been generally designated at 68, and includes a generally flat casing 70 supportable against one side of the receptacle 20. Casing 70 is formed wholly open at its inside, and may as shown be formed with an upwardly and arcuately curved upper end. Casing 70 can be attached to either side of the receptacle, at any location upon the length of the receptacle desired, and to this end, there is provided a hanger plate 72 (Fig. 15) formed as a vertically disposed, rectangular plate element having at its upper end an integrally provided top flange 74 extending horizontally toward the receptacle so as to overlie the flange 22 of said receptacle in contact with the receptacle flange. At its lower end, the rectangular plate element is integrally formed with a horizontally and inwardly extending bottom flange 76. The top flange 74 terminates in a downwardly extended lip 78 adapted to hook over the inside edge of the receptacle flange 22.

In this way, the hanger plate 72 can be swiftly hooked onto the selected side of the receptacle, at any desired location along the length of the receptacle, it being an important characteristic of the invention that the spit rotating mechanism and the associated spit can be swiftly moved to any location desired, to make maximum use of the fire or to leave a portion of the receptacle open for other foods to be broiled.

In any event, welded or otherwise fixedly secured to one end of lip 78 (Fig. 15) is an upwardly extending spit bearing bracket 80 having in its upper end a semicircular bearing recess 82. Removably attachable to the opposite side wall of the receptacle 20, in a position in which it will be aligned transversely of the receptacle with the bearing bracket 80, is a second spit bearing bracket 84 shown per se in Fig. 13. Bracket 84 is formed as a rectangular plate element integrally provided at its upper and lower ends with inwardly extended, horizontally disposed flanges 86, 88, the flange 86 terminating in a depending lip 89 adapted to hook over the adjacent portion of flange 22. A bearing plate 90 is welded to the upper end of plate 84, and extends upwardly above the top flange 86, having in its upwardly extended end a bearing opening 92 alignable with bearing recess 82 for journalling of the opposite ends of a spit 94 (Fig. 12) in the bearing opening and recess.

The spit 94 includes at one end a handle 96 which permits the spit to be manually rotated whenever desired and also facilitates grasping of the spit when the spit and the article of food carried thereby are to be removed bodily from cooking position. Handle 96 is rigid with the inner end of a shaft 98, which is of noncircular cross section to prevent rotation of the impaled food relative thereto. At one end, shaft 98 has a portion of circular cross section adapted to seat in the bearing recess 82, and at one end of said circular portion, there is affixed a gear 100, said gear being located at the inner end of handle 96. Collars 102, 104 are provided at opposite ends of the circular bearing portion of the shaft, to prevent movement of the shaft in the direction of its length when the spit is in use.

A suitable gear train is provided within casing 70, for the purpose of slowly rotating the spit. Said gear train has been illustrated to advantage in Fig. 15, and as will be noted, when the spit is in position upon the bearing brackets provided therefor, gear 100 will be in mesh with a gear 104, that meshes with a gear 106 concentric with and made rigid with a gear 108 larger in diameter than gear 106. Gear 108 meshes with a gear 110 of relatively small diameter as compared to gear 108, and gear 110 is concentric with and rigidly secured to a gear 112, substantially greater in diameter than gear 110. Gear 112 is in mesh with and is rotated by a small gear or pinion 114, secured to a larger gear 116 in concentric relation therewith, said gear 116 being driven by a worm 118 carried by a gear 120. Gear 120 is driven by a worm 122, powered by a spring motor 124, that is wound by a hand crank 126. Operation of the spring motor is controlled by an escapement including a handle 128, affixed to a shaft 129 on the inner end of which there is provided (Fig. 17) a radial arm 130 loosely engaged between fork arms 132 carried by the free end of a vertically swingable arm 134, over the upper edge of which is hooked a lateral extension provided upon a finger 136 extending upwardly from and made rigid with a plate 138. Plate 138, when shifted in opposite directions, imparts unidirectional rotation to worm shaft 122. Arm 134 is driven by the spring of the motor. Handle 128, when shifted to dispose arm 130 between the fork arms, acts as a brake on the motor.

It will be seen that reduction gearing is embodied in the device, in such a manner as to cause very slow rotation of the spit, the speed of rotation being such as to permit the heat of the bed of coals to act upon all surfaces of the food impaled upon the spit. It may be noted, in this connection, that the actual arrangement of meshing gears and brake means is not per se new, the mechanism being basically like that of a spring-wound clock, and no attempt is made to claim said gearing and brake means as novel except in the relationship which these components bear to other parts of the device, in the appended claims.

It is also believed of importance to note that the spit, when it is to be removed, is simply grasped by the handle and swung upwardly at the handle end, thus disengaging the spit gear 100 from the gear 104, while at the same time moving the spit out of the bearing bracket 80. Movement of the spit longitudinally thereof to the right in Fig. 3 will now disengage the spit at its pointed, outer end, from the bearing bracket 90.

When the device is in use as a rotisserie, it may be desired to cover that portion of the bed of coals which is not disposed immediately below or adjacent to the spit 94. To this end, there is provided a rectangular, flat cover plate 140 (Figs. 6 and 18) having at its opposite ends downwardly and inwardly turned flanges 142 engaging loosely over the flange 22 at opposite sides of the receptacle. Cover plate 140 is freely slidable longitudinally of the receptacle, and extends fully thereacross, to overlie the hot coals. In this way, heat rising from the coals immediately below the cover plate is required to travel laterally in the direction of the spit, to pass upwardly at opposite sides of the article of food impaled on the spit.

For use in association with the removable cover plate 140 there is provided a hood 144. This also serves to concentrate the heat upon the several surfaces of the food article carried by the spit. Hood 144 is removably positioned upon the receptacle, extending transversely thereacross. Hood 144, when seen in end elevation or in cross section, is trapezoidal in shape, said hood having an inclined wall extending from end to end thereof at one side, this being the side faced away from the spit. The other side of the hood is formed fully open, and thus, heat rising within the hood is deflected by the inclined wall and the horizontal top wall of the hood through the open side against the top and sides of the slowly rotated article of food.

The hood is extensible as to its length, and to this end is formed of a pair of overlapping hood portions 146, 148, portion 146 being telescoped in portion 148, with its lapped inner end having slots 150, receiving bolts 152 carried by portion 148. It will be seen that the slots and bolts constitute a connecting means that will permit the portions 146, 148 to be shifted toward or away from one another, to adjust the length of the hood, the bolts having wing nuts that can be tightened after the adjustment has been made, for the purpose of preserving the adjustment.

At its outer ends, the hood 144 has depending flanges 154, 156 straddling opposite sides of the receptacle, to support the hood upon the receptacle sides.

The hood can be adjusted to any location along the length of the receptacle, and as shown in Figs. 2 and 6, the hood portions have horizontally disposed longitudinal lips 158, 160 integrally formed upon and extending outwardly from the lower edges of the inclined walls of the hood portions to underlie the adjacent edge of the cover plate. In this way, the cover plate and hood combine to completely roof over the hot bed of coals, in a way that will cause all the heat rising from said bed of coals to be directed laterally and then upwardly within the hood, to be concentrated against the article of food carried by the slowly rotated spit 94.

When the device is to be stored away, the hood can be swiftly removed, and shortened in length to an extent sufficient to permit it to be recessed entirely within the receptacle as in Fig. 7, thus to occupy a minimum of space.

For the purpose of facilitating carrying of the collapsed device from place to place, there is provided at one end thereof a handle or bail 162 having outwardly extending ends pivotally engaged in sleeves 164 secured fixedly to the adjacent end wall of the receptacle. Handle 162 is integral or otherwise made rigid with an L-shaped arm 166 constituting a stop limiting downward swinging of the handle 162, whereby to conveniently dispose the handle where it can be grasped by a user. The stop arm 166 of the handle, of course, serves to hold the handle outwardly from the adjacent end wall of the device when the device is in use, and thus the handle will be kept cool and will not be heated by contact with said end wall.

The versatility of the structure can be readily appreciated, when it is observed that the structure can be constructed relatively inexpensively, and yet swiftly and easily converted into either a portable broiler or outdoor grill, or portable rotisserie, having a spit rotatably mounted thereon and a rotating means for the spit, with the spit, rotating means and hood being freely adjustable to any selected location upon the length of the receptacle portion of the device. At the same time, the entire device can be swiftly collapsed into a highly compact assembly, adapted to be stored in a comparatively small area.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A portable rotisserie comprising an upstanding supporting frame, an open-top rectangular receptacle at the top of the frame for holding fuel for supplying a fire for cooking food, an open casing removably mounted at one side of the receptacle, a hanger plate secured to said casing, a hooked portion at the top end of the hanger plate for hooking over the upper edge of the receptacle, a flange on the bottom end of the hanger plate for spacing the casing away from the receptacle, an angled bracket plate secured to the hooked portion of the hanger plate and extending upwardly above the receptacle, said bracket plate having a bearing recess, a hooked plate removably mounted on the receptacle at its opposite side, a bearing plate fixed on the upper end of said latter hooked plate, and having an opening aligned with the recess in the bracket on the hanger plate, a spit device journalled in said aligned recess and opening, and means carried by the casing for automatically rotating said spit device.

References Cited in the file of this patent

UNITED STATES PATENTS

| | | |
|---|---|---|
| 1,741,400 | Bocchino | Dec. 31, 1929 |
| 1,888,616 | Bocchino | Nov. 27, 1932 |
| 2,388,831 | Cramer | Nov. 13, 1945 |
| 2,419,344 | Eggleston | Apr. 22, 1947 |
| 2,505,976 | Leon | May 2, 1950 |
| 2,512,223 | Contiguglia | June 20, 1950 |
| 2,536,630 | Elmer | Jan. 2, 1951 |
| 2,541,528 | McAvoy | Feb. 13, 1951 |
| 2,559,710 | Danielson | July 14, 1951 |
| 2,608,190 | Winning et al. | Aug. 26, 1952 |
| 2,635,529 | Nisenson | Apr. 21, 1953 |
| 2,654,307 | Nisenson | Oct. 6, 1953 |